(12) United States Patent
Afridi et al.

(10) Patent No.: US 11,171,511 B2
(45) Date of Patent: Nov. 9, 2021

(54) CAPACITIVE WIRELESS POWER TRANSFER CIRCUIT AND RELATED TECHNIQUES

(71) Applicant: The Regents of the University of Colorado, a body corporate, Denver, CO (US)

(72) Inventors: Khurram K. Afridi, Boulder, CO (US); Brandon Regensburger, Lafayette, CO (US); Sreyam Sinha, Boulder, CO (US); Ashish Kumar, Boulder, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 0 days.

(21) Appl. No.: 16/239,420

(22) Filed: Jan. 3, 2019

(65) Prior Publication Data
US 2019/0207420 A1 Jul. 4, 2019

Related U.S. Application Data

(60) Provisional application No. 62/613,350, filed on Jan. 3, 2018.

(51) Int. Cl.
*H02J 50/05* (2016.01)
*H04B 5/00* (2006.01)
(Continued)

(52) U.S. Cl.
CPC .............. *H02J 50/05* (2016.02); *B60L 53/10* (2019.02); *H02J 50/40* (2016.02); *H02J 50/70* (2016.02);
(Continued)

(58) Field of Classification Search
CPC ........ H02J 50/05; H02J 50/70; H02J 2310/48; H02J 50/40; H04B 5/0012; H04B 5/0037; B60L 53/122; B60L 53/10
See application file for complete search history.

(56) References Cited

U.S. PATENT DOCUMENTS 3,958,247 A * 5/1976 Bogner .................. H01Q 3/242
                                                                343/754
7,400,169 B2 * 7/2008 Zhang ..................... H03F 3/191
                                                                326/115
(Continued)

*Primary Examiner* — Jared Fureman
*Assistant Examiner* — Duc M Pham
(74) *Attorney, Agent, or Firm* — FisherBroyles, LLP; Thomas J. Osborne, Jr.

(57) ABSTRACT

Capacitive wireless power transfer systems are provided. In one embodiment, for example, the system comprises two pair of coupled conducting plates; a first matching network coupled to the first pair of conducting plates; and a second matching network coupled to the second pair of conducting plates. At least one of the first and second matching networks comprises an inductor having inductance value selected based on at least one parasitic capacitance value of the capacitive wireless power transfer system. In another embodiment, a method of designing a capacitive wireless power transfer system is provided comprising determining a parasitic capacitance value of a capacitive wireless power transfer system and determining an inductance value of an inductor of at least one of the first and second matching network having a value selected based on at least one parasitic capacitance value of the capacitive wireless power transfer system.

21 Claims, 17 Drawing Sheets

(51) Int. Cl.
    *H02J 50/70*    (2016.01)
    *H02J 50/40*    (2016.01)
    *B60L 53/10*    (2019.01)
(52) U.S. Cl.
    CPC ......... *H04B 5/0012* (2013.01); *H04B 5/0037* (2013.01)

(56) References Cited

U.S. PATENT DOCUMENTS

| | | | |
|---|---|---|---|
| 2012/0112536 A1* | 5/2012 | Karalis | B60L 53/12 307/10.1 |
| 2016/0027550 A1* | 1/2016 | Srivastava | B32B 27/32 428/375 |
| 2018/0166915 A1* | 6/2018 | Afridi | H02J 50/40 |

* cited by examiner

CAPACITIVE WIRELESS POWER TRANSFER CIRCUIT AND RELATED TECHNIQUES

CROSS-REFERENCE TO RELATED APPLICATIONS

This application claims the benefit of United States provisional application No. 62/613,350, filed Jan. 3, 2018, which is hereby incorporated by reference as though fully set forth herein.

STATEMENT OF GOVERNMENT LICENSE RIGHTS

This invention was made with government support under award number DE-AR0000618 awarded by Advanced Research Projects Agency—Energy (ARPA-E), U.S. Department of Energy. The government has certain rights in the invention.

BACKGROUND a. Field

The instant invention relates to capacitive wireless power transfer systems.

b. Background

Major challenges in widespread adoption of electric vehicles are high cost, limited range and long charging times, due to limitations in battery technology. An effective approach to overcome these challenges is to substantially reduce on-board energy storage and instead utilize dynamic (in-motion) wireless power transfer (WPT) to deliver energy to the vehicle from the roadway. WPT for EVs can be achieved either using magnetic fields between inductively coupled coils, or using electric fields between capacitively coupled plates. Inductive WPT systems require ferrites for magnetic flux guidance; these ferrites are expensive, heavy, fragile, and necessitate a low operating frequency to limit core losses, resulting in relatively large system size. In contrast, capacitive WPT systems do not require ferrites and can operate at high frequencies, allowing these systems to be less expensive, more efficient, lighter, more compact and easier to embed in the roadway. Large air-gap capacitive WPT systems for EV charging applications have been recently examined, but owing to the large air-gap and the limited area available under the vehicle chassis (which together result in a very small coupling capacitance), designing high-power high-efficiency capacitive WPT systems for EV charging has been challenging. Furthermore, in practical implementations of these systems, it can be important to maintain fringing electric fields below the prescribed safety limits. In addition to EV charging, capacitive WPT systems can also be used for numerous other applications, including transferring energy wirelessly to biomedical implants, consumer electronics, robots, material handling equipment, elevators and hyperloop transport.

BRIEF SUMMARY

A high-power-transfer-density capacitive WPT system is provided that can also achieve high efficiency. In some embodiments, this performance is achieved through a combination of techniques. In one embodiment, for example, a method to model the large number of parasitic capacitances that exist in a capacitive WPT system in terms of a four-capacitance, or a three-capacitance, equivalent model is provided. In another embodiment, a method to determine the values of the capacitances in the four-capacitance and three-capacitance equivalent circuit models is provided. In some embodiments, to enhance the power transfer through the capacitive WPT system, matching networks employ a split-inductor design. Furthermore, to reduce the cost, complexity, and failure rate of a system by eliminating discrete capacitors, the capacitors of the matching networks can be realized using the parasitic capacitances of the system in some embodiments. In addition, circular, elliptical, or other sharp-corner-free conducting coupling plates can be utilized to increase power transfer density without the risk of arcing. The power transfer density of the capacitive WPT system can be further enhanced without the risk of arcing, by covering, or coating, the coupling plates with materials having high dielectric breakdown strength.

Three example prototype capacitive WPT systems are also presented. The first prototype utilizes two pairs of square metal plates separated by an air-gap as the capacitive coupler. In the second prototype, the square metal plates are covered with a layer of polytetrafluoroethylene (PTFE), also referred to as Teflon. The third prototype utilizes circular coupling plates covered with a layer of PTFE. The third prototype transfers 1217 W of power without arcing, which is more than a two-fold increase in power transfer when compared to the second prototype, where arcing occurs at 590 W, and more than an eleven-fold increase in power transfer when compared to the first prototype, where arcing occurs at 105 W.

The foregoing and other aspects, features, details, utilities, and advantages of the present invention will be apparent from reading the following description and claims, and from reviewing the accompanying drawings.

BRIEF DESCRIPTION OF THE DRAWINGS

FIG. 9(A) shows a Series-short test, FIG. 9(B) shows a Diagonal-short test and FIG. 9(C) shows a Parallel-short test.

FIG. 10(B) shows a second side facing the other pair of coupling plates across an air gap.

FIGS. 13(A) through 13(C) show example field plots of electric field strength when the coupling plate excitation level corresponds to 1200 W of power transfer for: FIG. 13(A) bare-copper square plates, FIG. 13(B) PTFE-enveloped square plates, and FIG. 13(C) PTFE-enveloped circular plates.

FIGS. 14(A) through 14(C) show examples of different corner-free coupling plates that can be used to alleviate the risk of arcing in capacitive WPT systems in which FIG. 14(A) shows a circular coupling plate, FIG. 14(B) shows an elliptical coupling plate and FIG. 14(C) shows a corner-free square coupling plate.

FIGS. 17(A) and 17(B) show an example circular-shaped coupling plate enveloped in PTFE in which FIG. 17(A) shows a side facing the vehicle chassis/roadway, and FIG. 17(B) shows a side facing the other pair of coupling plates across the air gap.

FIGS. 18(A) and 18(B) show graphs of measured waveforms of the prototype capacitive WPT system using circular coupling plates with PTFE, operating at 1217 W in which FIG. 18(A) shows inverter output voltages and current, and FIG. 18(B) shows system input voltage and current, and voltage across the load resistor.

DETAILED DESCRIPTION

Architecture of Capacitive WPT System

Figure 1:
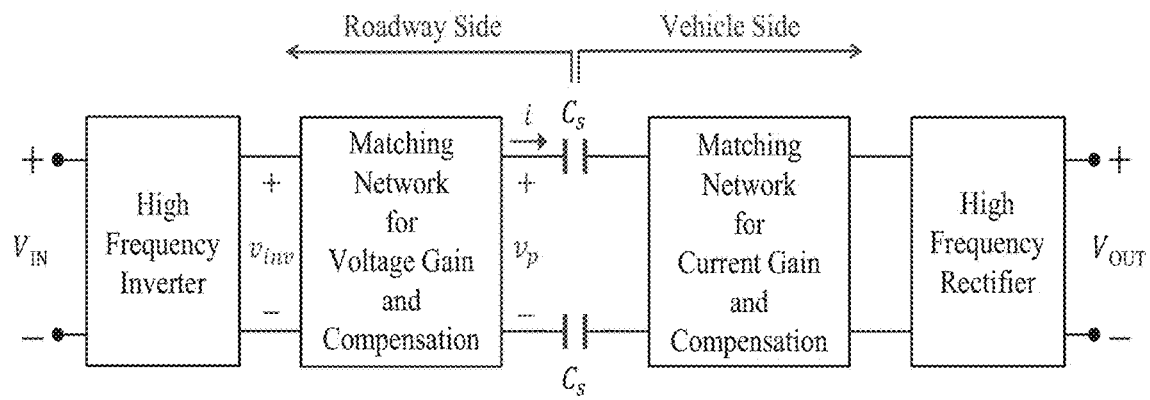
FIG. 1 shows a schematic diagram of an example architecture of a capacitive WPT system.

The architecture of an example capacitive WPT system is shown in FIG. 1. Wireless power transfer in this system is achieved using two pairs of conducting plates, a transmitter pair and a receiver pair, separated by an air-gap. An inverter converts the dc input voltage into high-frequency ac, which is fed into a resonant matching network that steps up the voltage. This creates a high voltage at the transmitting side of the coupling plates, enabling high power transfer with low displacement currents through the air-gap, and hence low voltage across the air-gap and relatively low fields. This matching network also partially compensates for the capacitive reactance of the coupling plates. On the receiving side of the coupling plates is a second resonant matching network that steps the current back up (and the voltage down) to the level desired to deliver power to the load. Furthermore, this network provides the remaining compensation for the plate reactance. Finally, a high-frequency rectifier interfaces the system to the load.

Figure 2:
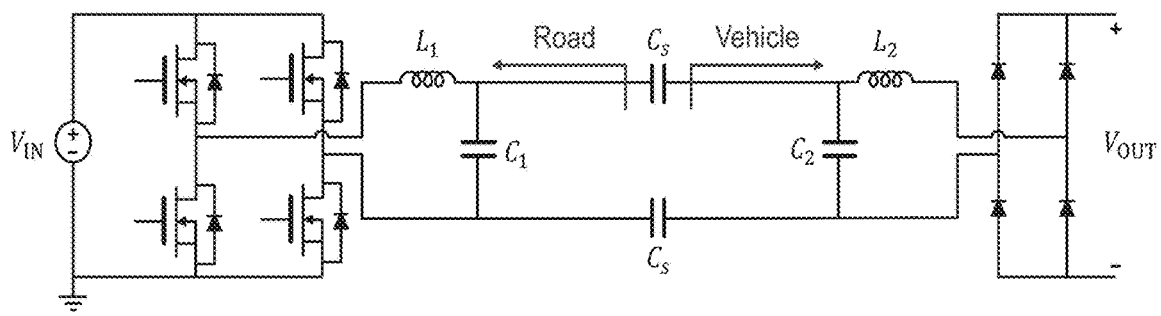
FIG. 2 shows a schematic diagram of an example implementation of a capacitive WPT system for an EV charging application comprising a full-bridge inverter, a full-bridge rectifier, and single-stage L-section matching networks on the road side and the vehicle side.
Figure 3:
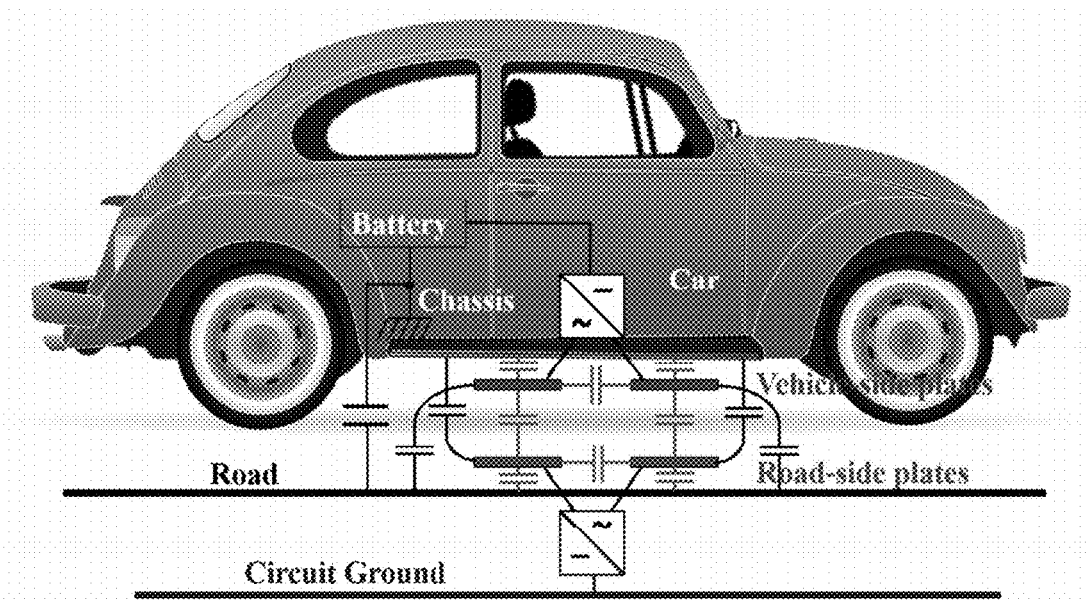
FIG. 3 shows a schematic diagram of an example implementation of an EV charging environment for a capacitive WPT system showing various parasitic capacitances involved.
Figure 4:
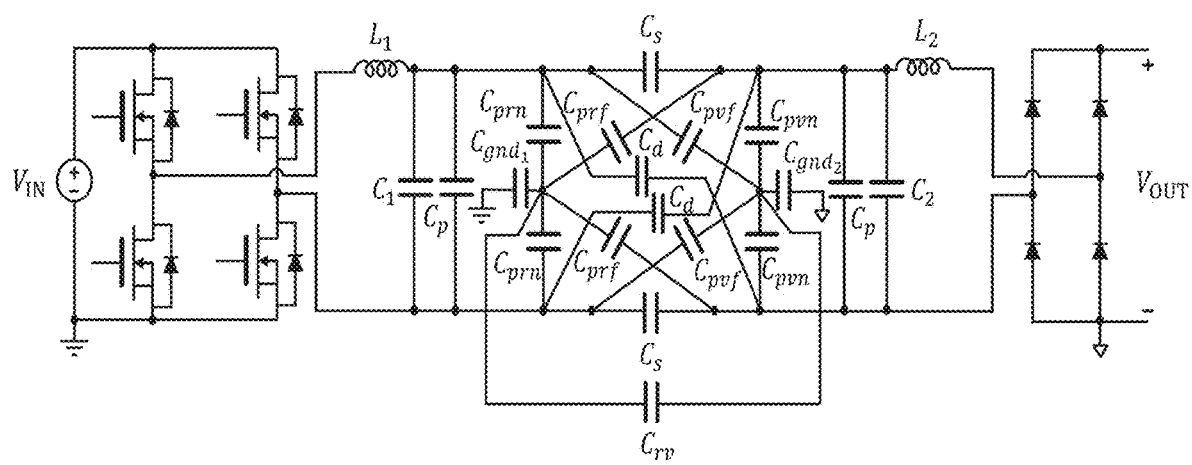
FIG. 4 shows a schematic diagram of an example capacitive WPT system incorporating parasitic capacitances present in an example EV charging environment.

An example implementation of the capacitive WPT architecture of FIG. 1 for an electric vehicle charging application is shown in FIG. 2. It comprises a full-bridge inverter, single-stage L-section matching networks that provide the required gains and compensation, and a full-bridge rectifier. The inverter transistors in this system are operated with zero voltage switching (ZVS) to achieve high efficiencies at high switching frequencies. This is ensured by designing the impedance seen at the inverter output to be sufficiently inductive for ZVS. The capacitive coupling mechanism can be modeled in this circuit using two capacitors, shown as $C_s$ in FIG. 2. This simple representation is found to be inadequate when a practical EV charging environment is considered, as shown in FIG. 3. It can be seen that, apart from the desired capacitance between the coupling plates, 15 additional parasitic capacitances exist in this system, including the cross-coupling capacitances between the plates, and the capacitances between the plates and the vehicle chassis and roadway. The circuit schematic of a capacitive WPT system incorporating all these capacitances is shown in FIG. 4. In a high-frequency capacitive WPT system for EV charging, the effect of the parasitic capacitances cannot be ignored. A modeling and design approach that enables the capacitive WPT system of FIG. 4 to achieve high performance at high frequency in presence of the parasitic capacitances is presented next.

Matching Network Design Approach for Absorption of Parasitic Capacitances

Figure 5:
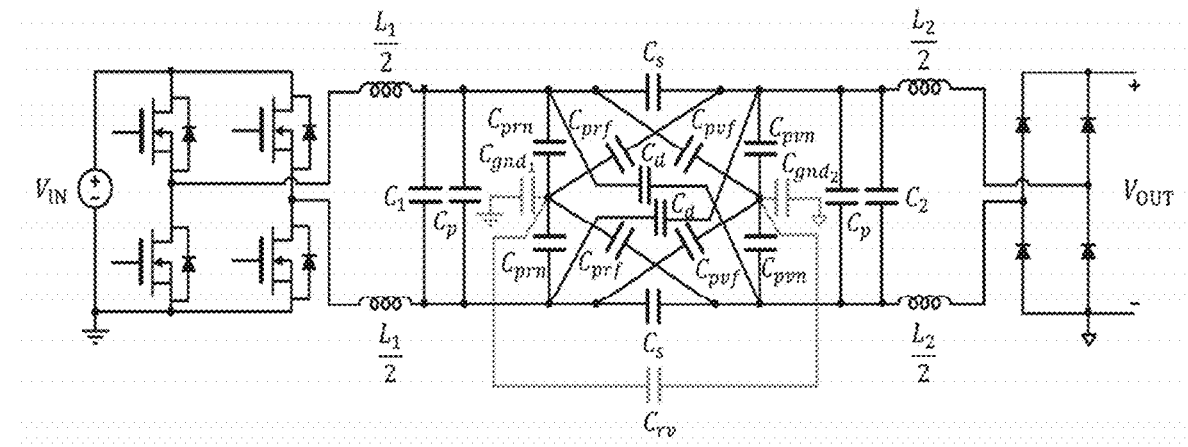
FIG. 5 shows a schematic diagram of an example capacitive WPT system incorporating the parasitic capacitances present in an EV charging environment with matching network inductors split symmetrically into two halves, with one half in a forward path and the other in a return path.

This disclosure presents an approach to model the high-order capacitance system shown in FIG. 4 using a reduced set of 4 capacitances. The parasitic capacitances shown as $C_{gnd1}$ and $C_{gnd2}$ in FIG. 4 represent the capacitance between the road and the inverter ground, and the capacitance between the vehicle chassis and the rectifier ground, respectively. The capacitance $C_{rv}$ represents the capacitance between the road and the vehicle chassis. The first step in the proposed approach is to ensure that no current flows through these parasitic capacitances. This is achieved by splitting the inductors of the matching networks symmetrically into two halves, with one half placed in the forward path, and the other in the return path, as shown in FIG. 5. In this symmetric circuit, the voltages appearing across the capacitances $C_{gnd1}$, $C_{gnd2}$ and $C_{rv}$ are zero, which prevents any parasitic currents from flowing through them. It can be noted that the matching networks can alternatively be designed using series capacitors and shunt inductors. In such designs, the above parasitic currents can be eliminated by splitting the series capacitors equally in the forward and return paths. With these parasitic currents eliminated, the circuit of FIG. 5 can be simplified, using series and parallel combinations of capacitances and two-port network theory, to the 4-capacitance model shown in FIG. 6. The 4 capacitances of FIG. 6 can be expressed in terms of the original parasitic capacitances as:

$$C_{s,eqv} = C_s - C_d, \quad (1)$$

$$C_{p1,eqv} = C_p + \frac{C_{pm}}{2} + \frac{C_{pvf}}{2} + C_d, \quad (2)$$

$$C_{p2,eqv} = C_p + \frac{C_{pvn}}{2} + \frac{C_{prf}}{2} + C_d. \quad (3)$$

Figure 6:
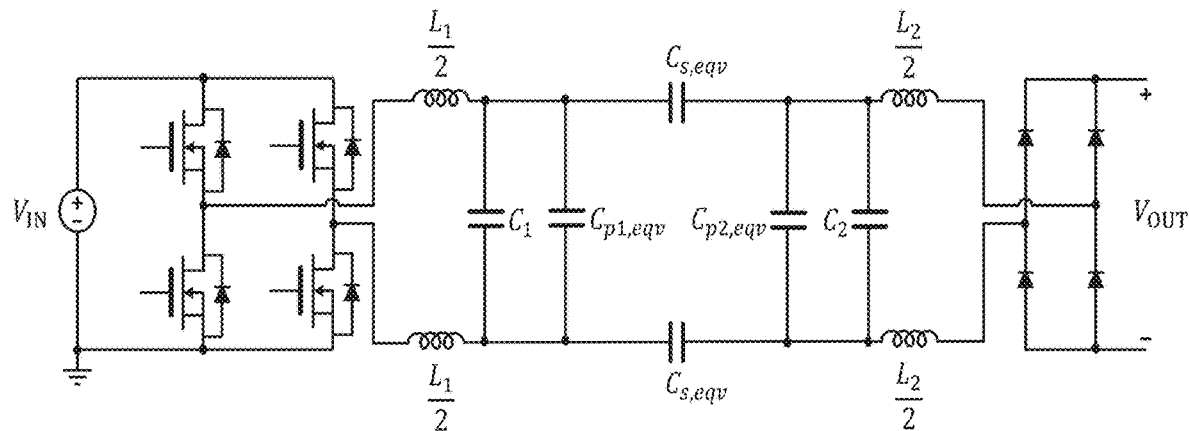
FIG. 6 shows a schematic diagram of an example capacitive WPT system with matching network capacitors realized entirely using the parasitic capacitances present in an EV charging environment.
Figure 7:
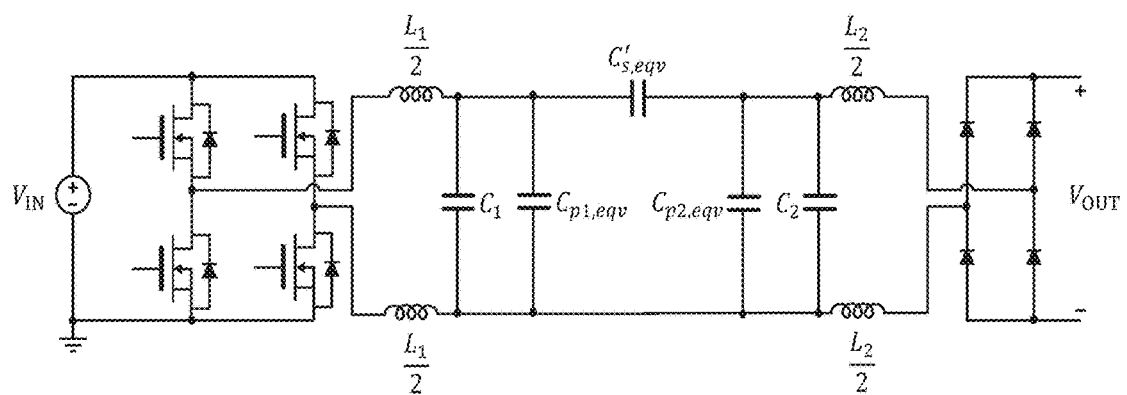
FIG. 7 shows a schematic diagram of an example capacitive WPT system with symmetrically split inductors, and coupling and parasitic capacitances modeled together as an equivalent 4-capacitance network.

The equivalent series capacitances $C_{s,eqv}$ of the 4-capacitance model can be combined to further reduce the circuit of FIG. 6 to an equivalent 3-capacitance model, as shown in FIG. 7. The equivalent series capacitance in this model is given by:

$$C'_{s,eqv} = \frac{C_{s,eqv}}{2}. \quad (4)$$

It can be seen that the shunt capacitances in the 4-capacitance model of FIG. 6, $C_{p1,eqv}$ and $C_{p2,eqv}$, appear in parallel with the L-section matching network capacitors $C_1$ and $C_2$ on the road side and the vehicle side, respectively. These shunt capacitances can now be absorbed into the matching networks by appropriately modifying the matching network capacitor values. Since the shunt capacitances $C_{p1,eqv}$ and $C_{p2,eqv}$ are functions of the parasitic capacitances present in the EV charging environment (see (2) and (3)), this modeling approach enables the parasitic capacitances to be absorbed in the matching networks and utilized in the main power transfer mechanism of the capacitive WPT system.

Matching Network without Discrete Capacitors

Figure 8:
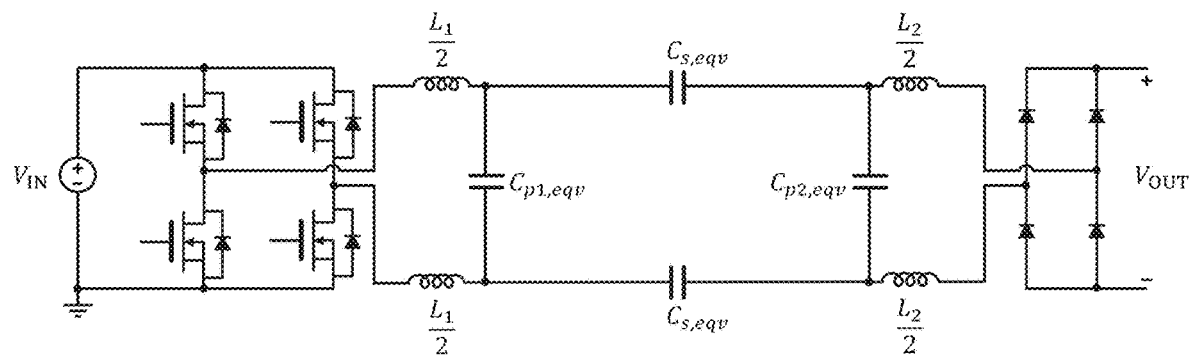
FIG. 8 shows a schematic diagram of an example capacitive WPT system with symmetrically split inductors, and coupling and parasitic capacitances modeled together as an equivalent 4-capacitance network.
Figure 9A:
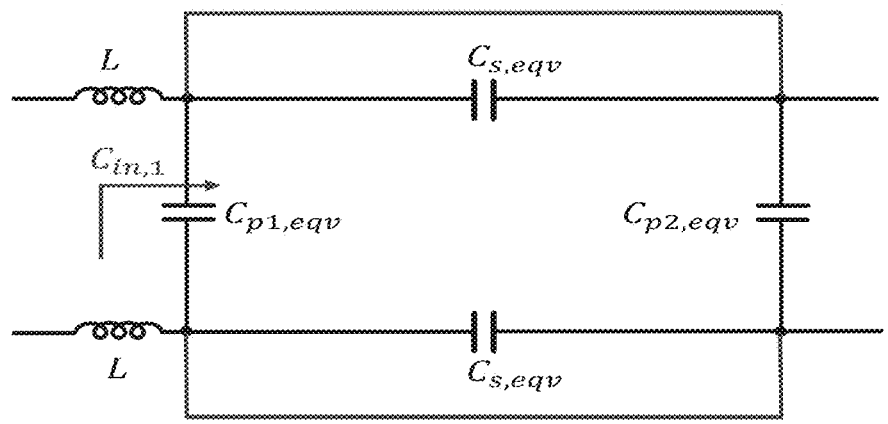
FIGS. 9(A) through 9(C) show schematic diagrams of an example Measurement setups for the three example tests to measure an equivalent capacitances of a 4-capacitance model.
Figure 9B:
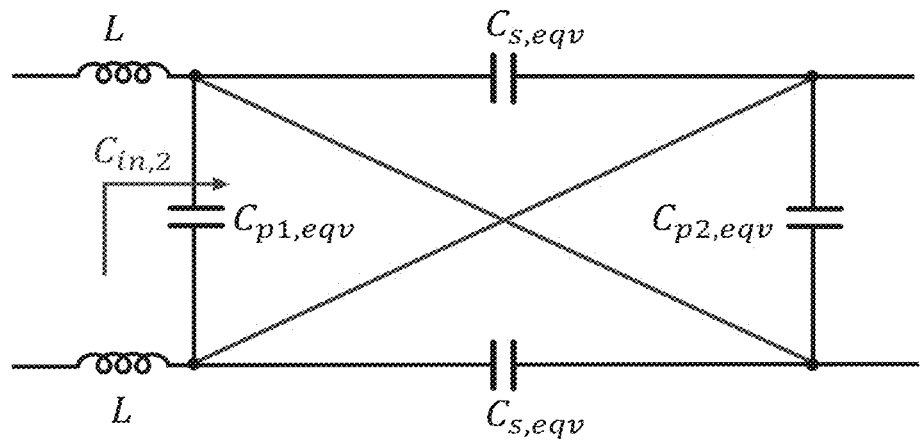
Figure 9C:
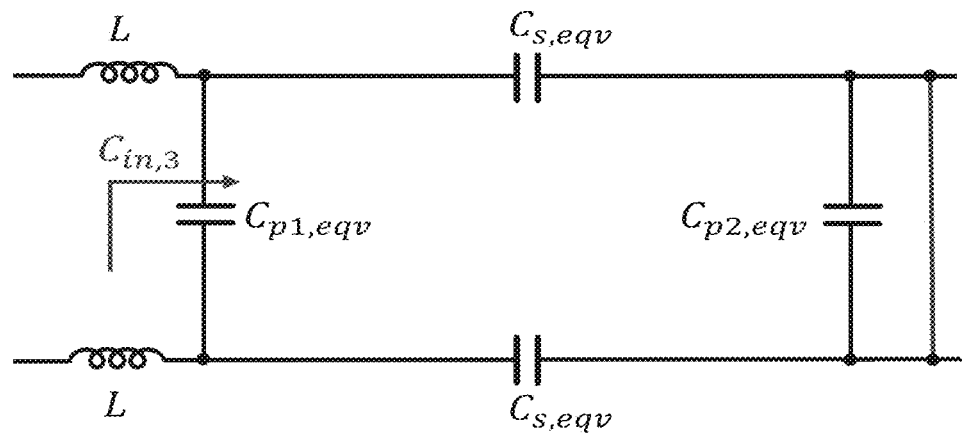

The efficiency and reliability of the capacitive WPT system of FIG. 6 can be further enhanced by fully realizing the required matching network capacitances using the shunt capacitances $C_{p1,eqv}$ and $C_{p2,eqv}$ of the 4-capacitance model. This eliminates the need for discrete high-voltage capacitors in the matching networks, which introduce losses and may be prone to dielectric breakdown. The required values for the shunt capacitances can be obtained by appropriately spacing the coupling plates from the roadway and the vehicle chassis, as will be demonstrated for an experimental prototype later in this document. An improved capacitive WPT system not requiring discrete matching network capacitors is shown in FIG. 8.

Determination of Equivalent Capacitances in the 4-Capacitance Model

The capacitive WPT system of FIG. 7 is effectively a resonant converter that is tuned to operate at a fixed frequency (such as an ISM band frequency of 6.78 MHz or 13.56 MHz). For this tuned resonant converter to operate as desired, the inductance and capacitance values in the circuit must be known to a high degree of accuracy. The inductance values can be reliably measured using well-established high-frequency measurement techniques. However, measuring the equivalent capacitances shown in FIG. 7 is more challenging, since these originate from a complex configuration of parasitic capacitances, as shown in FIG. 5. This section presents three tests to accurately determine the equivalent capacitances in the 4-capacitance model.

Series-Short Test

In this test, the two coupling plates in the forward path of the system are shorted to each other, as are the two coupling plates in the return path, as shown in FIG. 8(a). Then, the capacitance looking into the system $C_{in,1}$, is measured. This is done by connecting two inductors of the same known value to the pair of coupling plates on the road side, and exciting the system with a sinusoidal voltage of variable frequency. The frequency of this input voltage is varied until resonance is achieved, that is, the input voltage and input current are in phase. If the resonant frequency of this system is $f_{o,1}$, the capacitance looking into the system can be determined from:

$$C_{in,1} = \frac{1}{8\pi^2 f_{o,1}^2 L}. \quad (5)$$

Here, L is the inductance of each of the test inductors

Diagonal-Short Test

In this test, the plates located diagonally across from one another are shorted, as shown in FIG. 8(b). The capacitance looking into the system is then measured following the same procedure as in the series-short test. If the resonant frequency of this system is $f_{o,2}$, then the input capacitance is given by:

$$C_{in,2} = \frac{1}{8\pi^2 f_{o,2}^2 L}. \quad (6)$$

Parallel-Short Test

In this test, the two coupling plates on the vehicle side of the system are shorted to one another, as shown in FIG. 8(c). The capacitance looking into the system is then measured following the same procedure as the previous two tests. If the resonant frequency of this system is $f_{o,3}$, the input capacitance can be determined from:

$$C_{in,3} = \frac{1}{8\pi^2 f_{o,3}^2 L}. \quad (7)$$

It can be shown that the equivalent capacitances in the 4-capacitance model of FIG. 7 can be expressed in terms of the three input capacitances $C_{in,1}$, $C_{in,2}$ and $C_{in,3}$ determined above, as:

$$C_{s,eqv} = \frac{C_{in,2}}{2} - \frac{C_{in,1}}{2}, \tag{8}$$

$$C_{p1,eqv} = C_{in,3} - \frac{C_{in,2} - C_{in,1}}{4}, \tag{9}$$

$$C_{p2,eqv} = \frac{3C_{in,1} + C_{in,2}}{4} - C_{in,3}. \tag{10}$$

This three-test approach enables the equivalent capacitances of the 4-capacitance model to be determined with a high degree of accuracy, allowing the matching networks to be designed for effective power transfer at high frequencies.

Coupling Plate Design to Eliminate Arcing

Figure 10A:
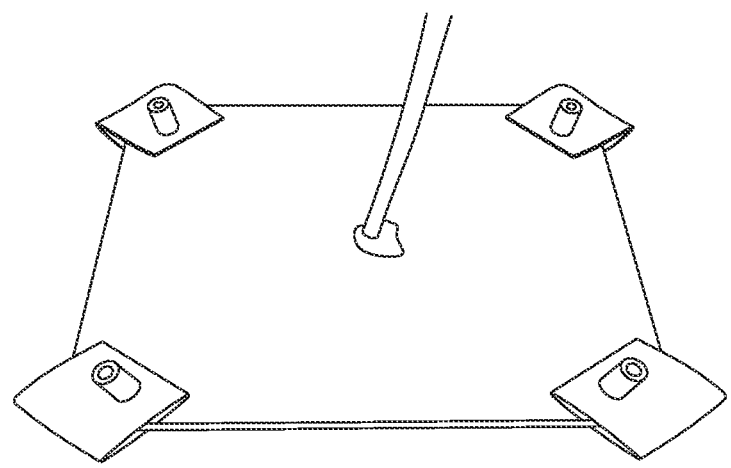
FIGS. 10(A) and 10(B) show example square-shaped coupling plate enveloped in a PTFE covering in which FIG. 10 (A) shows a first side facing the vehicle chassis/roadway.
Figure 10B:
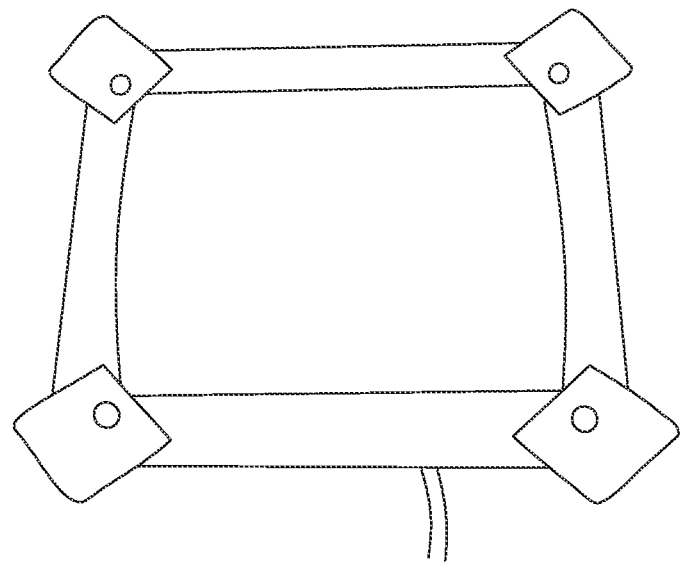
Figure 11:
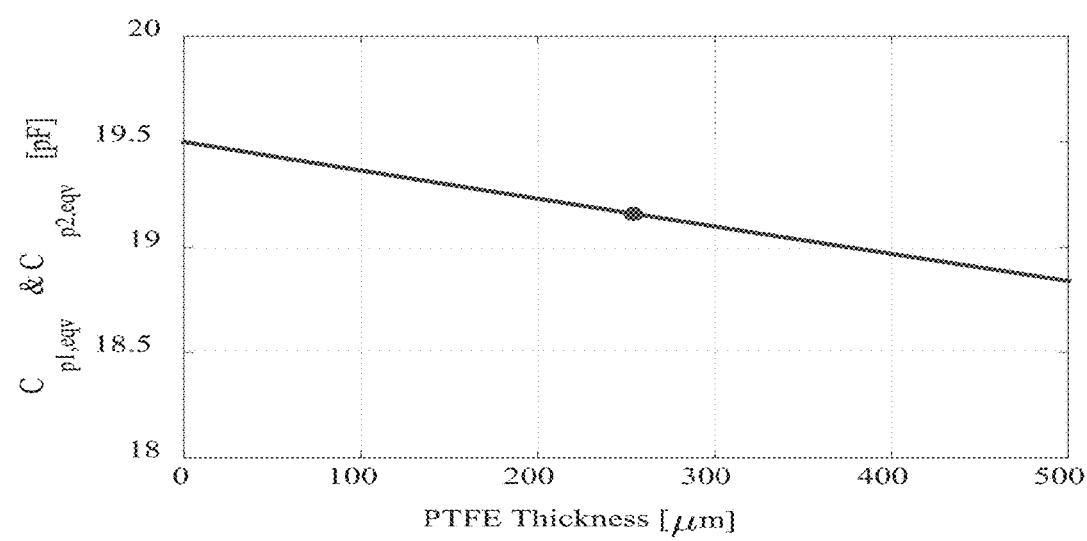
FIG. 11 shows variation in matching network capacitances $C_{p1,eqv}$ and $C_{p2,eqv}$ as a function of the thickness of the PTFE layer used to cover the coupling plates for an example 1200-W capacitive WPT system.

A major challenge in achieving high power transfer levels in capacitive WPT systems for EV charging is the risk of arcing due to the high voltages created between the coupling plates and the vehicle chassis, and the coupling plates and the roadway. Arcing creates a short circuit through the air which causes a drift between the system resonant and operating frequencies, leading to system failure and potential component damage. An effective approach to alleviating the risk of arcing is to envelope the coupling plates in a material that has high dielectric breakdown strength. Examples of such materials include polytetrafluoroethylene (PTFE), also known as Teflon, polyethylene terephthalate (PET), also known as Mylar, Kapton, and mica. In this work, PTFE (or Teflon) is chosen for its high dielectric strength of >20 MV/m (which is more than six times higher than that of air), and for its low dissipation factor at MHz frequencies [11]. Photographs of a square-shaped coupling plate enveloped in a layer of PTFE are shown in FIG. 10. Since PTFE has a dielectric constant of 2.1, and it completely covers one side of the coupling plate (see FIG. 10($a$)), adding the PTFE envelope may significantly change the capacitance between the coupling plate and the vehicle-chassis, and between the coupling plate and the roadway. This capacitance contributes a major fraction of the matching network capacitances $C_{p1}$ and $C_{p2}$ in the capacitive WPT system of FIG. 8. Since the matching networks provide relatively large gain, they have relatively high loaded quality factors and are sensitive to changes in component values. Therefore, it is important that the change in capacitance caused by the PTFE envelope is quantified. FIG. 11 shows the variation in the matching network capacitances $C_{p1,eqv}$ and $C_{p2,eqv}$ as a function of the thickness of the PTFE layer used to cover the coupling plates for an example 1200-W capacitive WPT system. It can be seen that for PTFE thicknesses less than 500 μm, the capacitances $C_{p1,eqv}$ and $C_{p2,eqv}$ change by less than 5% compared to their value without PTFE. For the prototype capacitive WPT systems described in the next section, a 254-μm thick layer of PTFE is utilized (the red circular marker in FIG. 11), which changes the capacitances $C_{p3,eqv}$ and $C_{p2,eqv}$ by only 1.74%; hence, minimally impacting the electrical behavior of these systems. Note that if thicker layers of PTFE than those considered in FIG. 11 are required to prevent arcing, the change in capacitance can be more significant and must be factored into the system's design. However, the thicker the PTFE layer, the higher the associated dielectric losses.

Figure 12:
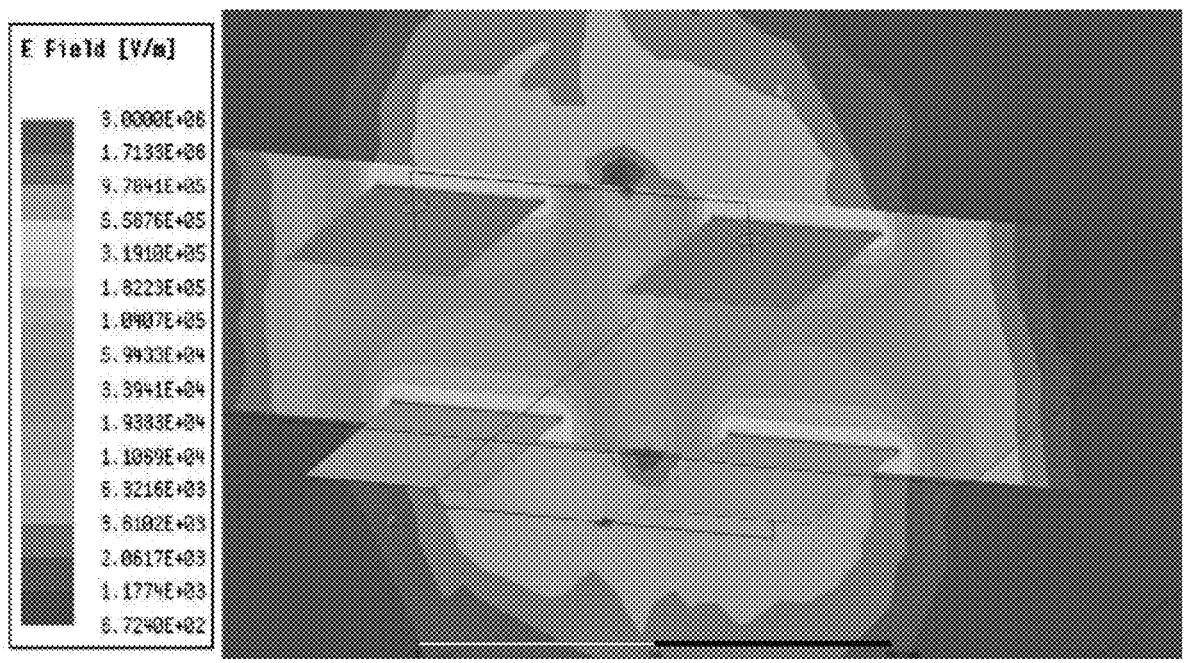
FIG. 12 shows an example field plot of square coupling plates.
Figure 13A:
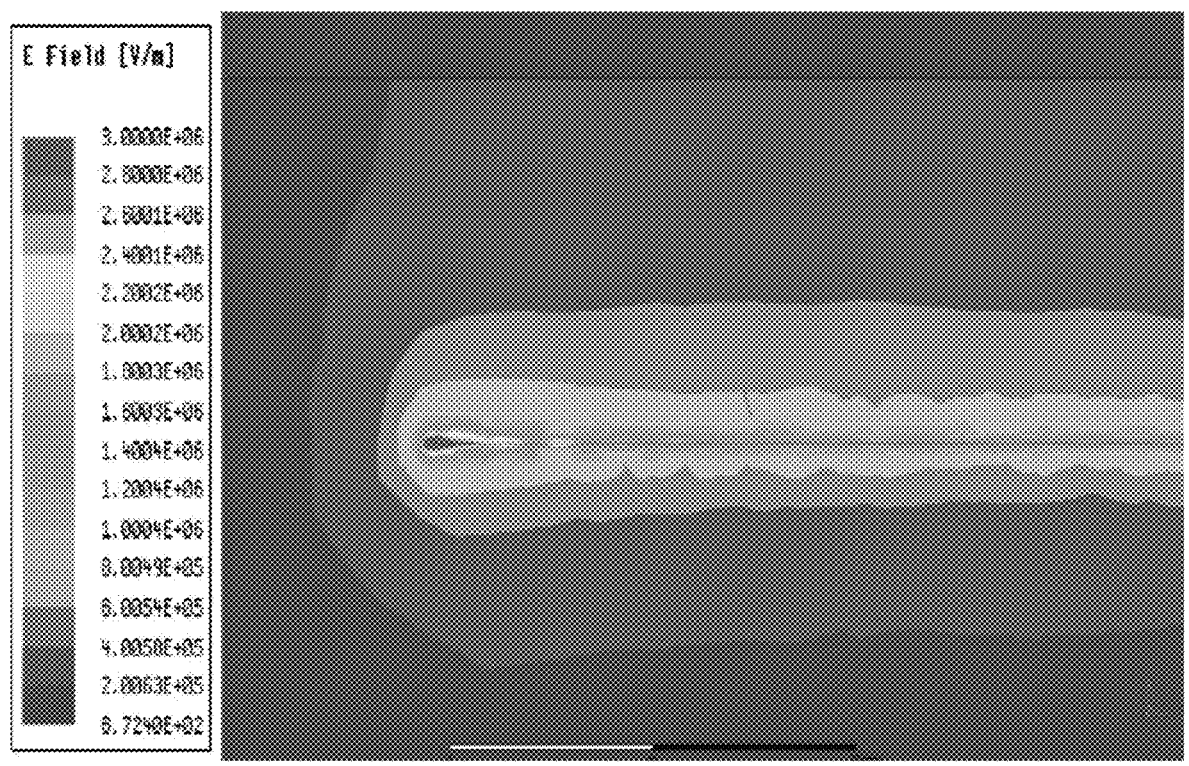
Figure 13B:
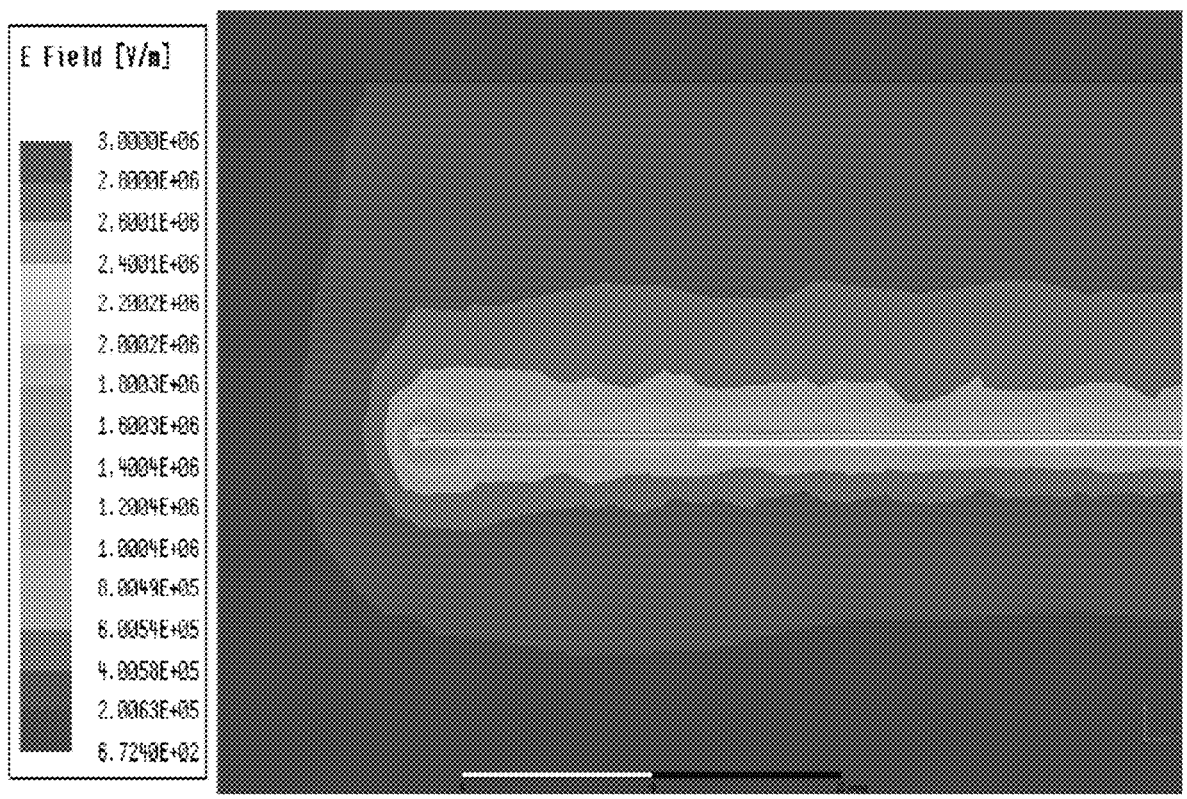
Figure 13C:
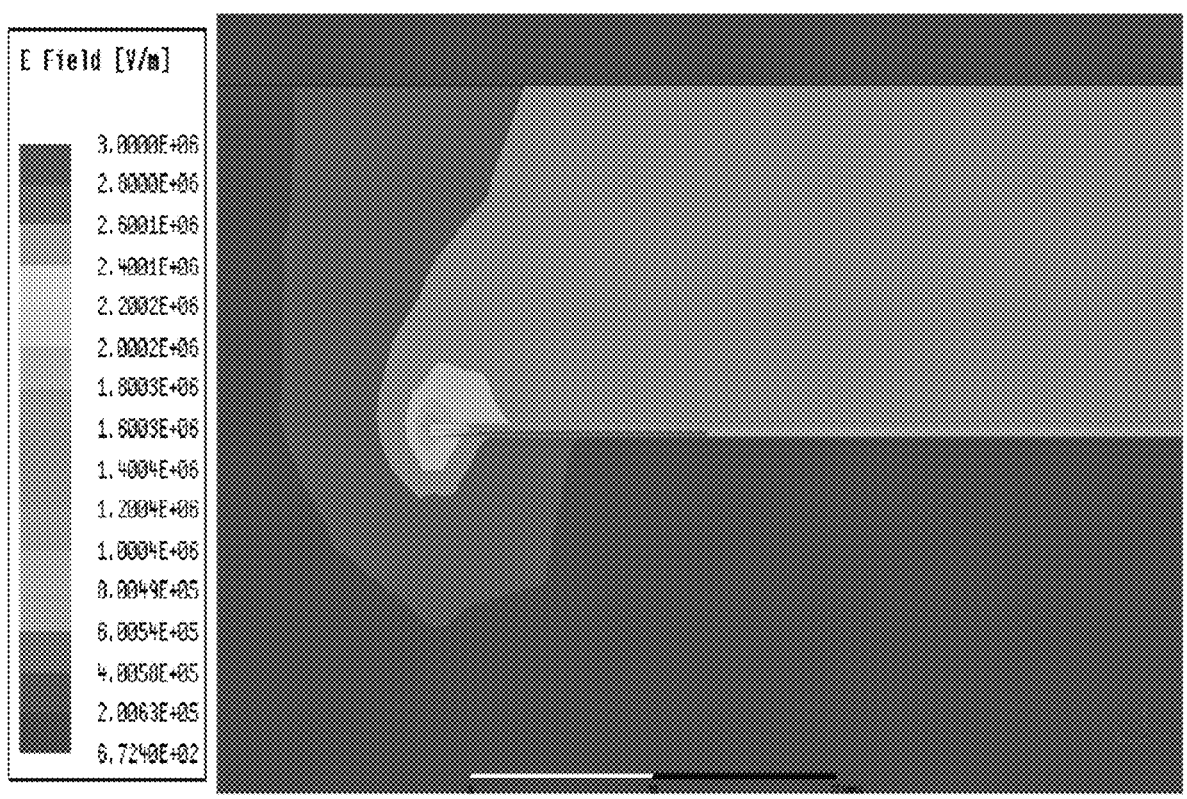

To demonstrate the benefits of utilizing PTFE, an Ansys HFSS model of 150-cm² square-shaped coupling plates is created, as shown in FIG. 12. Simulations are performed to obtain the electric field strength in the vicinity of the plates at excitation levels corresponding to 1200 W of power transfer, both for bare copper plates and for plates enveloped in PTFE. FIG. 13($a$) shows a zoomed-in side-view of one of the bare copper plates. It can be seen that near the corner of the plate, where the concentration of electric charge is maximum, the field strength exceeds 3 MV/m (as indicated by the red portion of the scale); hence, resulting in the dielectric breakdown of air. A similar view of the plate when enveloped in 254-μm of PTFE is shown in FIG. 13($b$). The maximum field strength near the corner of the plate is now reduced 2.4 MV/m (yellow portion of the scale), enabling higher power transfer levels before arcing.

Figure 14A:
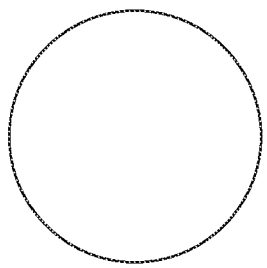
Figure 14B:
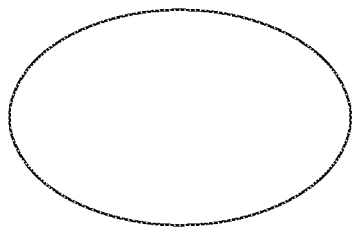
Figure 14C:
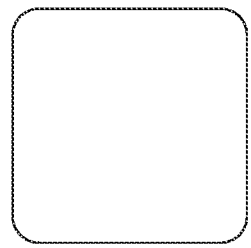

As discussed above, the electric field strength, and hence, the risk of arcing is highest near the corner of the coupling plates, both with and without PTFE (see FIGS. 13($a$) and 13($b$)). Therefore, arcing is most likely to occur at these corners (which is also experimentally validated later). To further alleviate arcing and achieve even higher power transfer levels, it is preferable to utilize corner-free coupling plates—for example, circular, elliptical or rounded-corner square plates, as shown in FIG. 14. By avoiding corners, such shapes exhibit a more even distribution of charge, and hence, lower peak electric fields in the vicinity of the plates. This has also been verified in simulation. As an example, a zoomed-in side-view of 150-cm² circular coupling plates enveloped in 254-μm PTFE is shown in FIG. 13($c$). The edges of the plates now have a peak field strength of 1.2 MV/m (green portion of the scale). Compared to PTFE-enveloped square plates, this represents a factor-of-two reduction, and hence, proportionally higher power transfer capability.

Example High Power Transfer Density Capacitive WPT System

Figure 15:
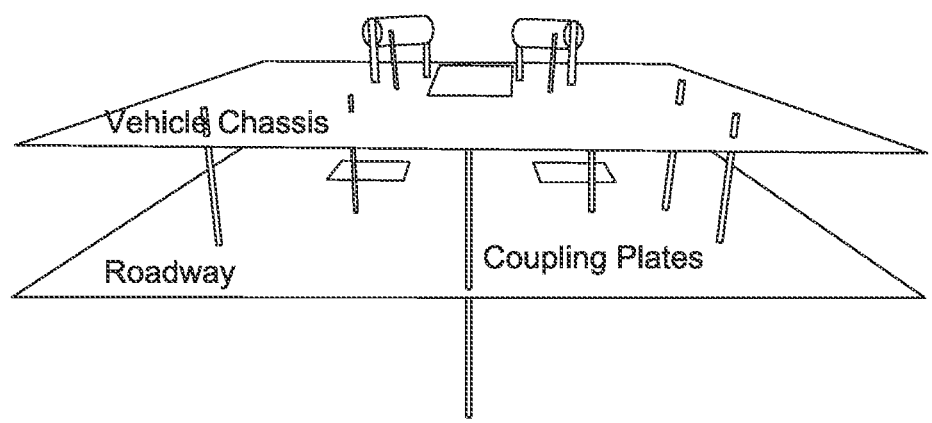
FIG. 15 shows an image of an example capacitive WPT system.

A series of prototype 6.78-MHz 12-cm air-gap capacitive WPT systems are built and tested to validate the efficacy of the above-described coupling plate design enhancements. These prototype systems have a circuit schematic similar to that shown in FIG. 8, with one difference being that the rectifier and battery are emulated by a resistive load. A photograph of the prototype system with PTFE-enveloped square coupling plates is shown in FIG. 15. The large aluminum sheets visible in FIG. 15 are used to mimic the vehicle chassis and the road, and the distance between these sheets and the coupling plates (seen between the sheets) is controlled to realize the desired matching network capacitances. The inverter is constructed using 650-V 30-A GaN Systems GS66508T enhancement-mode GaN transistors. The matching network inductors are realized as single-layer air-core solenoids. Component details of the prototype systems are provided in Table I.

TABLE I

SELECT CIRCUIT PARAMETERS OF THE PROTOTYPE CAPACITIVE WPT SYSTEMS

| Plate Area [cm²] | $C_{plate}$ [pF] | $L_1$ & $L_2$ [μH] | $C_{p1}$ & $C_{p2}$ [pF] | $R_{load}$ [Ω] |
|---|---|---|---|---|
| 150 | 0.88 | 53 | 9.58 | 45 |
| 118 | 0.46 | 53 | 3.95 | 45 |

Figure 16:
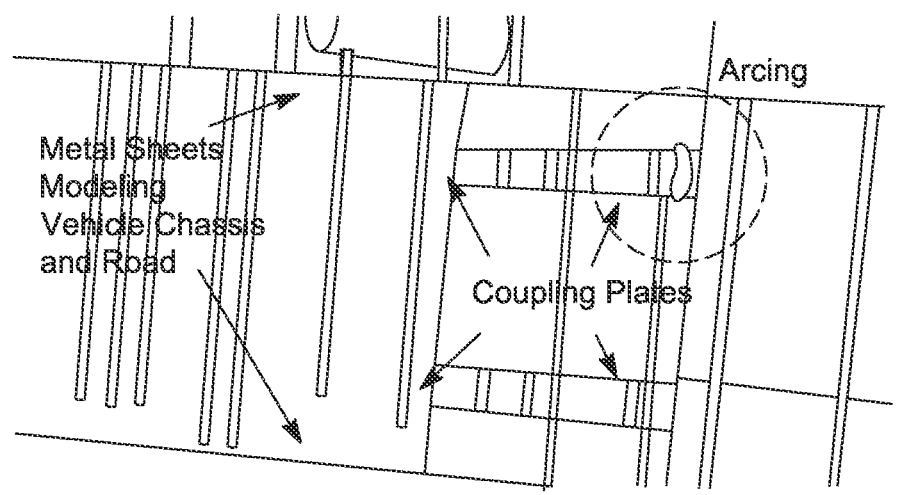
FIG. 16 shows an example image of a dielectric breakdown of air (i.e., arcing), between the coupling plates and the vehicle chassis.
Figure 17A:
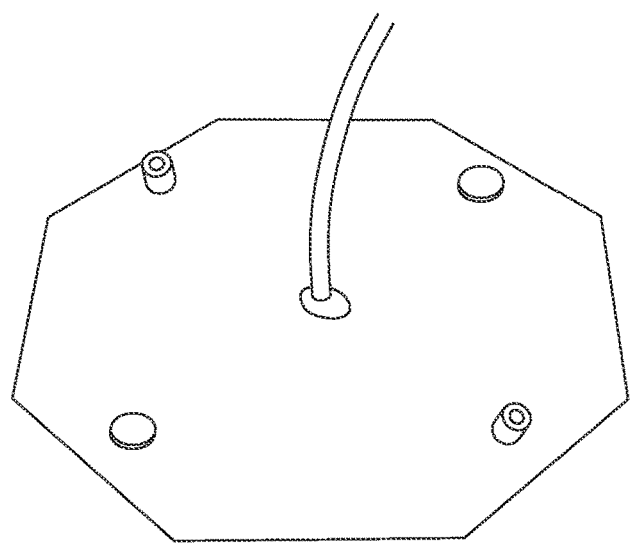
Figure 17B:
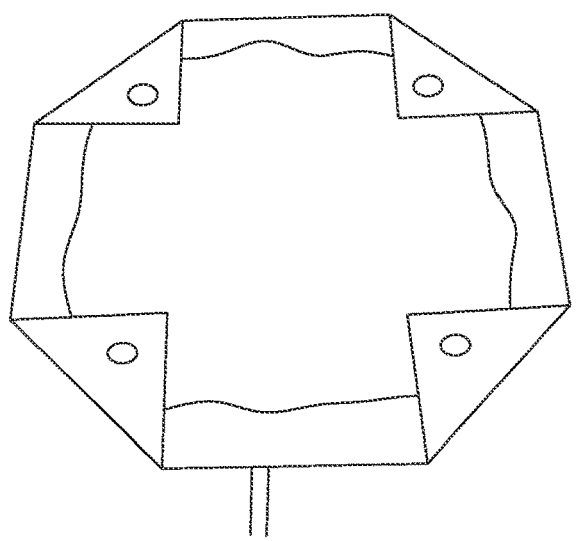
Figure 18A:
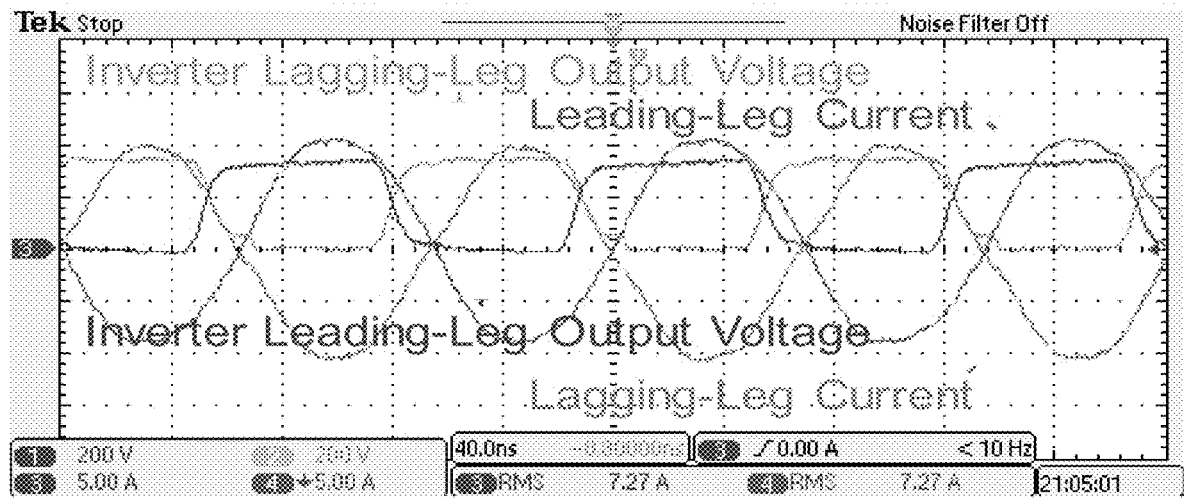
Figure 18B:
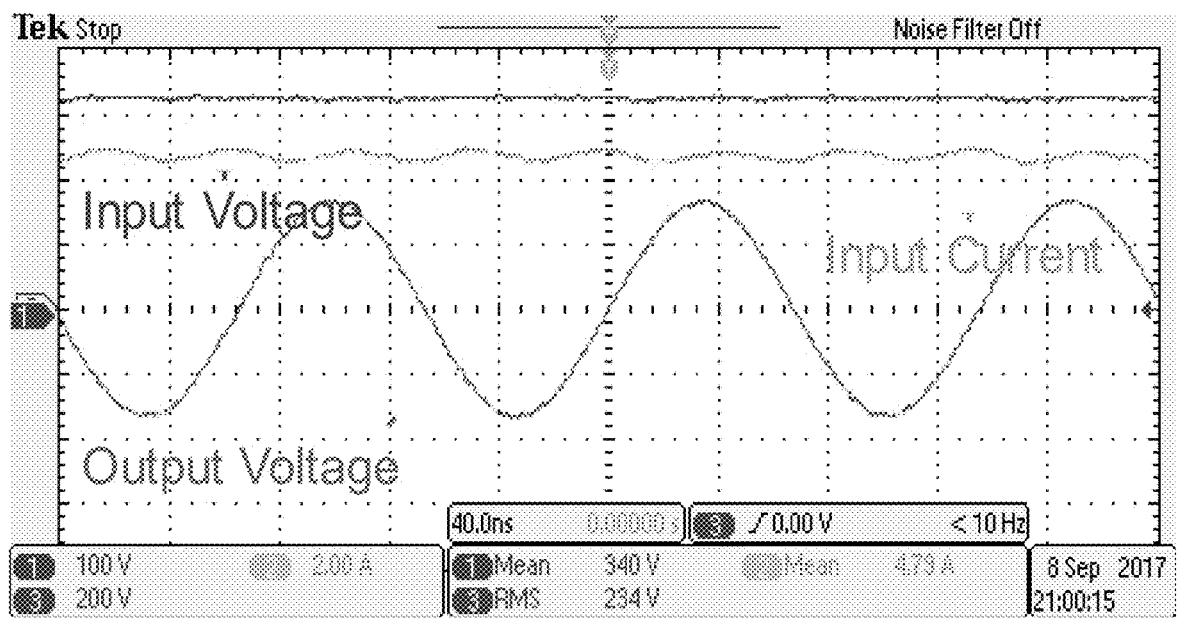
Figure 19:
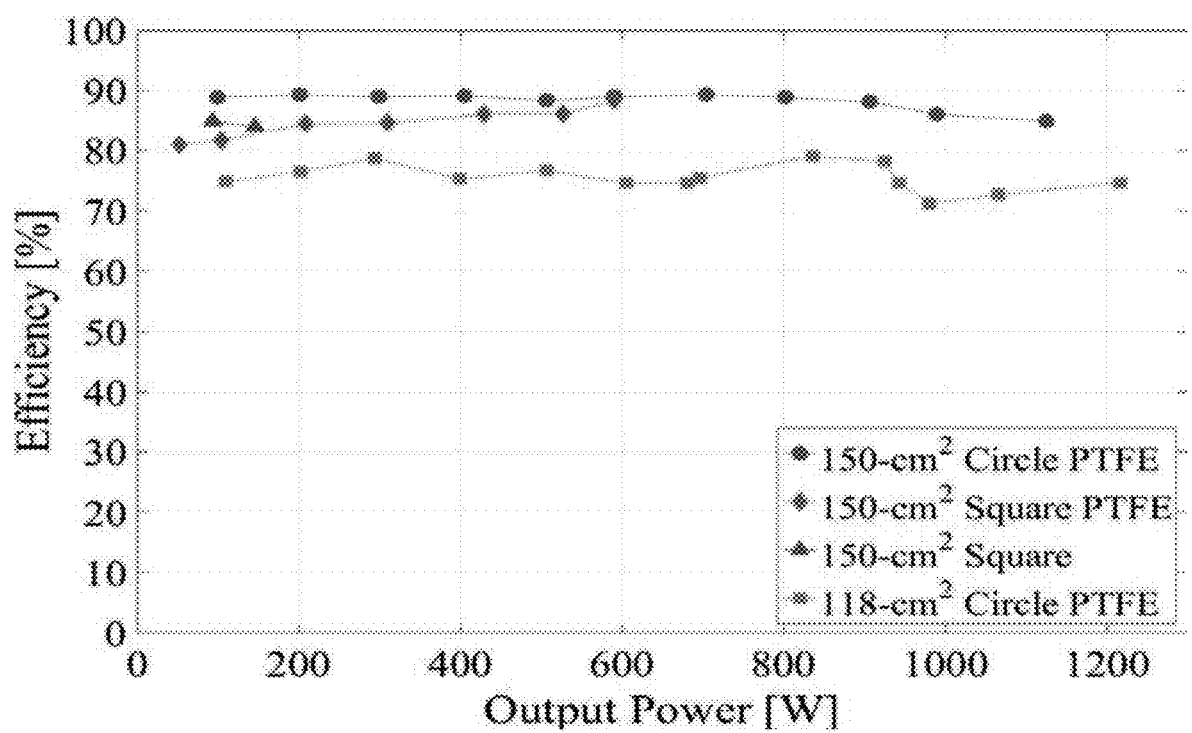
FIG. 19 shows an example plot of efficiency versus power transfer for the prototype capacitive WPT systems utilizing: bare-copper 150-cm² square (blue), PTFE enveloped 150-cm² square plates (red), PTFE enveloped 150-cm² circular plates (green), and PTFE enveloped 118-cm² circular plates (magenta).

The first prototype system utilizes 150-cm² bare-copper 12.25-cm×12.25-cm square coupling plates. This design transfers up to 146 W at an efficiency of 84%, achieving a power transfer density of 4.9 kW/m² before arcing occurs between the corners of the coupling plates and the aluminum sheet modeling the vehicle chassis, as shown in FIG. 16. The square coupling plates are then enveloped in a 254-μm thick layer of PTFE. This design transfers up to 590 W at an efficiency of 88.4%, achieving a power transfer density of 19.7 kW/m$^2$ before arcing occurs again. Next, the square coupling plates are replaced by circular coupling plates having the same 150-cm$^2$ area (13.8-cm diameter), also enveloped in a 254-μm thick layer of PTFE, as shown in FIG. 17. This design transfers up to 1125 W at an efficiency of 85%, achieving a record power transfer density of 37.5 kW/m$^2$. Additionally, this circular plate design achieves a peak efficiency of 89.4% at 700 W of power transfer. To push the power transfer density even higher, a fourth coupling plate design with 118-cm$^2$ circular (12.25-cm diameter) coupling plates enveloped in 254-μm thick PTFE is constructed. This design operating at 7.42 MHz transfers up to 1217 W at an efficiency of 74.7%, achieving a power transfer density of 51.6 kW/m$^2$, which exceeds the power transfer density of any reported large air-gap capacitive WPT system by more than a factor of two [9]. Measured waveforms of the prototype system transferring 1217 W are shown in FIG. 18. It can be seen from FIG. 18(*a*) that the inverter operates with zero-voltage switching (ZVS). A plot of efficiency versus power transfer for all four coupling plate designs is shown in FIG. 19.

Figure 20:
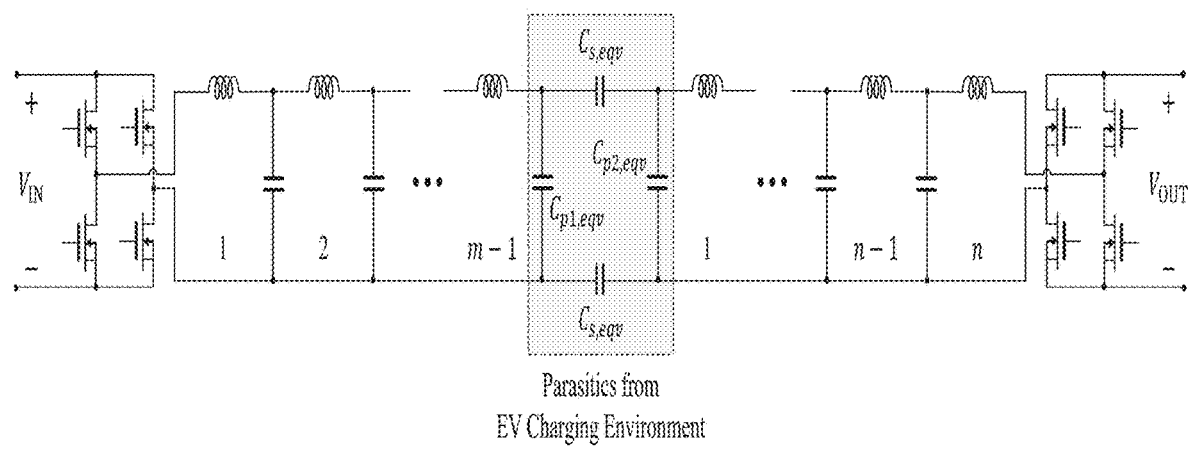
FIG. 20 shows a schematic diagram of an example embodiment of a capacitive WPT system for EV charging with m-stage matching network on a roadway side and an n-stage matching network on a vehicle side, where the capacitances of the last stage of the roadway-side matching network ($C_{p1,eqv}$) and the first stage of the vehicle-side matching network ($C_{p2,eqv}$) are implemented using the parasitic capacitances of the EV charging environment.

Variants of the capacitive wireless power transfer systems provided herein include an electric vehicle capacitive WPT system with a multistage L-section network (e.g., located on a side of a roadway) whose last stage's shunt capacitance is realized using parasitics present in the EV charging environment, and/or a multistage network on the vehicle side whose first stage's shunt capacitor is realized using parasitics. FIG. 20, for example, shows such an example capacitive WPT system for EV charging with m stages in the roadway-side matching network, and n stages in the vehicle-side matching network. Any combination of single-stage and multistage networks on both sides can be considered too.

In another variant, a split-inductor matching network is provided in which depending on the level of asymmetry in the coupler, the inductors are split at any suitable ratio (kL and (1-k)L, k is any fraction) to eliminate parasitic ground currents. Splitting them in half is suitable only for a symmetric system where the two plates on the same side (roadway or vehicle) has the same area and are at the same distance from the roadway/vehicle.

Figure 21:
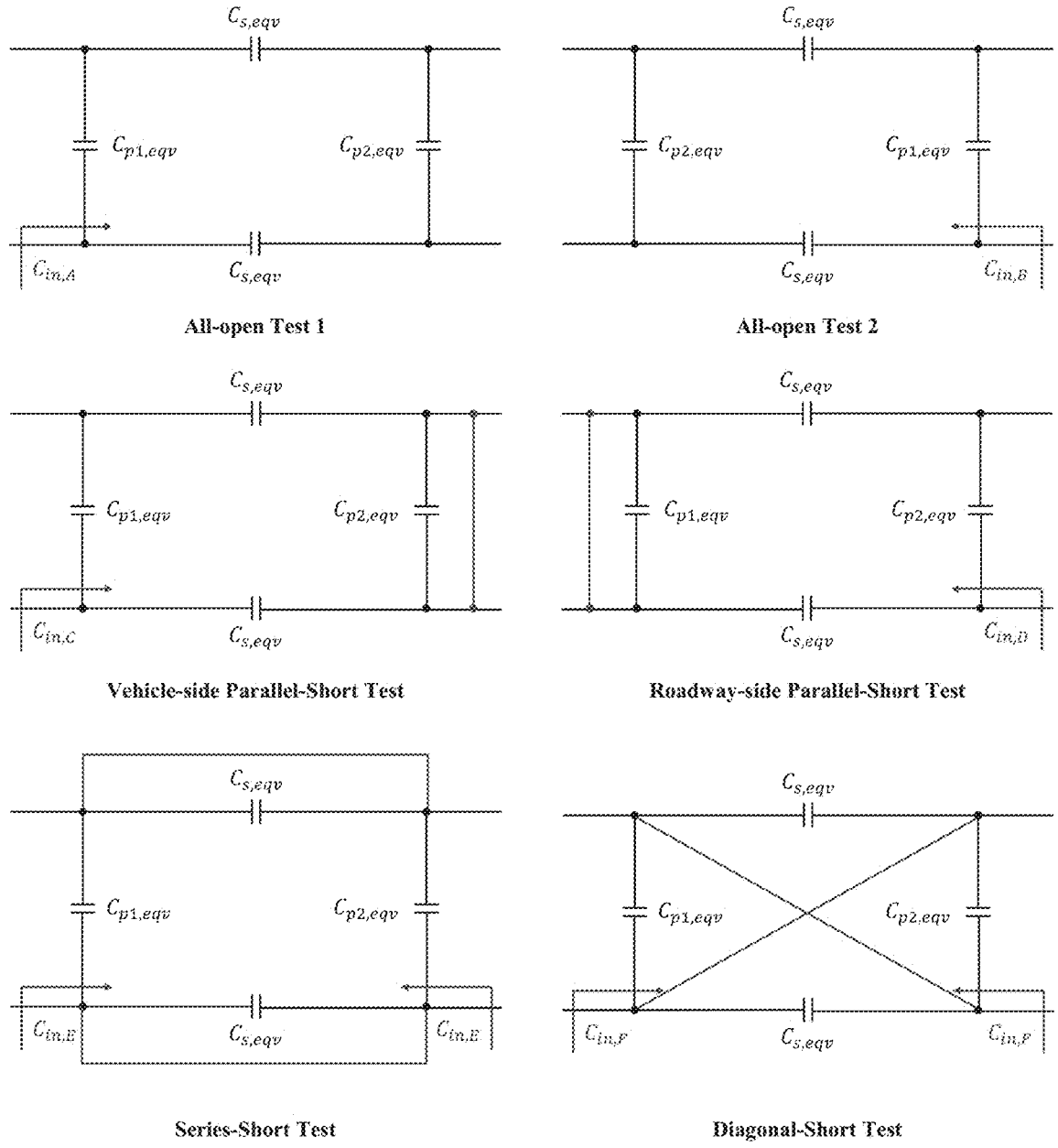
FIG. 21 shows a schematic diagram of an example embodiment showing six possible two-port measurements in order to determine values of equivalent capacitances $C_{p1,eqv}$, $C_{p2,eqv}$, and $C_{s,eqv}$ of the four-capacitance model of FIG. 6, while maintaining symmetry to ensure the validity of the four-capacitance model.

In yet another variant, to measure the values of shunt and series capacitances of an equivalent model of a coupler, any three measurements can be used that maintain the symmetry of the system. In one particular embodiment, for example, it can be found that there are six such symmetric measurements possible, and they are shown in FIG. 21. Any three among these six measurements can be used to determine the values of the equivalent capacitance. In the example method discussed in this document, the series-short test, the diagonal-short test, and the vehicle-side parallel-short test were used.

Different embodiments are described herein to describe different concepts that may be used in various implementations of capacitive wireless transfer system. One of skill in the art would readily appreciate that elements described with reference to various example embodiments may be used in other embodiments, such as those described herein. For example, various capacitive wireless power transfer systems may include single stage, multi-stage or combinations of single stage and multi-stage matching networks.

Although implementations have been described above with a certain degree of particularity, those skilled in the art could make numerous alterations to the disclosed embodiments without departing from the spirit or scope of this invention. All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A capacitive wireless power transfer system comprising:
   two pair of coupled conducting plates;
   a first matching network coupled to the first pair of conducting plates; and
   a second matching network coupled to the second pair of conducting plates, wherein at least one of the first and second matching networks comprises an inductor having inductance value selected based on a capacitance value of at least one parasitic capacitor formed by a parasitic interaction between any two conducting plates of the two pair of coupled conducting plates of the capacitive wireless power transfer system.

2. The capacitive wireless power transfer system of claim 1 wherein each of the first and second matching networks comprise at least one matching network stage comprising capacitance solely attributable to the at least one parasitic capacitance of the capacitive wireless power transfer system.

3. The capacitive wireless power transfer system of claim 2 wherein the use of parasitic capacitances in place of at least one discrete capacitor in each of the first and second matching networks of the capacitive wireless power transfer system reduces cost, complexity and probability of failure for the capacitive wireless power transfer system.

4. The capacitive wireless power transfer system of claim 1 wherein each of the first and second matching networks comprise at least one matching network stage comprising a capacitance value based upon a parasitic capacitance of the wireless power transfer system.

5. The capacitance wireless power transfer system of claim 1 wherein the matching network inductor value of the capacitive wireless power transfer system is determined based upon a four-capacitance or a three capacitance equivalent model of a number of parasitic capacitances that exist in the capacitive wireless power transfer system.

6. The capacitive wireless power transfer system of claim 1 wherein each of the first and second matching networks comprise a split-inductor or split-capacitor in the matching network of the capacitive wireless power transfer system to achieve symmetry and enhance power transfer.

7. The capacitive wireless power transfer system of claim 1 wherein at least one pair of conducting plates comprise at least one of the group comprising: circular, elliptical or other corner-free conducting coupling plates.

8. The capacitive wireless power transfer system of claim 7 wherein at least one pair of conducting plates increase power transfer density without risk of arcing.

9. The capacitive wireless power transfer system of claim 1 wherein at least one pair of conducting plates comprise at least one of the group comprising: a covering or a coating of a material with an electric field breakdown strength greater than that of air.

10. The capacitive wireless power transfer system of claim 9 wherein the covering or coating on at least one pair of coupled conducting plates of the capacitive wireless power transfer systems increase power transfer density without a reduced risk of arcing.

11. The capacitive wireless power transfer system of claim 1 wherein the capacitive wireless power transfer system comprises an electric vehicle (EV) capacitive wireless power transfer system.

12. The capacitive wireless power transfer system of claim 1 wherein the capacitive wireless power transfer system comprises an inverter coupled to the first matching network and a rectifier coupled to the second matching network.

13. The capacitive wireless power transfer system of claim 12 wherein the inverter comprises a full-bridge inverter.

14. The capacitive wireless power transfer system of claim 12 wherein the rectifier comprises a full-bridge rectifier.

15. A capacitive wireless power transfer system comprising:
    two pair of coupled conducting plates;
    a first matching network coupled to the first pair of conducting plates; and
    a second matching network coupled to the second pair of conducting plates,
    wherein at least one of the first and second matching networks comprises an inductor having inductance value selected based on at least one parasitic capacitance value of the capacitive wireless power transfer system, at least one of the first and second matching networks comprises a multi-stage matching network, and at least one stage of the multi-stage matching network uses parasitic capacitances to augment or replace discrete capacitances.

16. The capacitive wireless power transfer system of claim 15 wherein the at least one of the first and second matching networks comprising a multi-stage matching network comprises a stage coupled to one of the first and second coupled conducting plates comprises an inductor having inductance value selected based on a parasitic capacitance value of the capacitive wireless power transfer system.

17. A method of designing a capacitive wireless power transfer system comprising:
    determining a parasitic capacitance value of a capacitive wireless power transfer system comprising:
        two pair of coupled conducting plates;
        a first matching network coupled to a first pair of the conducting plates; and
        a second matching network coupled to a second pair of the conducting plates; and
    determining an inductance value of an inductor of at least one of the first and second matching network having a value selected based on a capacitance value of at least one parasitic capacitor formed by a parasitic interaction between any two conducting plates of the two pair of coupled conducting plates of the capacitive wireless power transfer system.

18. The method of claim 17 wherein the operation of determining the inductance value comprises using a model of the capacitive wireless power transfer system.

19. The method of claim 18 wherein the model comprises using a four-capacitance and/or three-capacitance equivalent circuit model of a capacitive wireless power transfer system.

20. The method of claim 17 wherein the first and second matching networks comprise at least one matching network stage comprising capacitance solely or partially attributable to a parasitic capacitance of the capacitive wireless power transfer system.

21. The method of claim 17 wherein each of the first and second matching networks comprise at least one matching network stage comprising a capacitance value based upon a parasitic capacitance of the wireless power transfer system.

* * * * *